United States Patent
Anton et al.

(10) Patent No.: US 9,623,978 B2
(45) Date of Patent: Apr. 18, 2017

(54) METHOD FOR PROVIDING PREDEFINED DRIVE CHARACTERISTICS IN AN AIRCRAFT, AND ASSOCIATED DRIVE DEVICE

(71) Applicant: Siemens Aktiengesellschaft, München (DE)

(72) Inventors: Frank Anton, Erlangen (DE); Swen Gediga, Höchstadt/Aisch (DE); Johannes Wollenberg, Gräfelfing (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/407,398

(22) PCT Filed: May 15, 2013

(86) PCT No.: PCT/EP2013/060068
§ 371 (c)(1),
(2) Date: Dec. 11, 2014

(87) PCT Pub. No.: WO2013/186003
PCT Pub. Date: Dec. 19, 2013

(65) Prior Publication Data
US 2015/0148993 A1    May 28, 2015

(30) Foreign Application Priority Data

Jun. 12, 2012  (DE) .................. 10 2012 209 803

(51) Int. Cl.
*B64D 31/00*    (2006.01)
*B64D 31/06*    (2006.01)
(Continued)

(52) U.S. Cl.
CPC ............. *B64D 31/06* (2013.01); *B64D 27/24* (2013.01); *G09B 9/10* (2013.01); *G09B 9/44* (2013.01);
(Continued)

(58) Field of Classification Search
None
See application file for complete search history.

(56) References Cited

U.S. PATENT DOCUMENTS 7,546,186 B2 *    6/2009    Yang ..................... B60K 6/387
                                                            477/3
7,679,226 B2       3/2010    Jajtic et al.
(Continued)

FOREIGN PATENT DOCUMENTS

CH        703 260 A1     12/2011
CN        101674985 A    3/2010
(Continued)

*Primary Examiner* — Jonathan M Dager
(74) *Attorney, Agent, or Firm* — Henry M. Feiereisen LLC

(57) ABSTRACT

The invention relates to a method for providing predefined desired drive characteristics (38, 50) in an aircraft, characterized by the following steps: —driving a thrust generation element of the aircraft by means of an electric motor that has actual drive characteristics (34) which include at least some of the desired drive characteristics (38, 50) but are also partly different therefrom; and—having a control device adjust operating points of the electric motor exclusively according to the desired drive characteristics (38, 50).

21 Claims, 2 Drawing Sheets

(51) Int. Cl.
*B64D 27/24* (2006.01)
*G09B 9/10* (2006.01)
*G09B 9/44* (2006.01)
*B64D 27/02* (2006.01)

(52) U.S. Cl.
CPC ......... *B64D 2027/026* (2013.01); *Y02T 50/64* (2013.01); *Y10S 903/93* (2013.01)

(56) References Cited

U.S. PATENT DOCUMENTS

| | | | |
|---|---|---|---|
| 7,863,782 B2 | 1/2011 | Matscheko et al. | |
| 8,099,944 B2 * | 1/2012 | Foster | F02C 6/18 60/226.1 |
| 8,237,321 B2 | 8/2012 | Hoppe et al. | |
| 8,296,036 B2 * | 10/2012 | Matuszeski | B64C 39/024 244/190 |
| 9,174,741 B2 * | 11/2015 | Suntharalingam | B64D 27/02 |
| 9,194,285 B2 * | 11/2015 | Botti | B64D 27/24 |
| 9,340,299 B2 * | 5/2016 | Yates | B64D 39/00 |
| 9,376,208 B1 * | 6/2016 | Gentry | B64C 39/024 |
| 2003/0075643 A1 | 4/2003 | Dunn | |
| 2003/0230671 A1 * | 12/2003 | Dunn | B64D 27/24 244/53 R |
| 2005/0269441 A1 | 12/2005 | Barocela | |
| 2008/0184906 A1 * | 8/2008 | Kejha | B64C 39/024 102/374 |
| 2008/0190732 A1 | 8/2008 | Matscheko et al. | |
| 2010/0083632 A1 * | 4/2010 | Foster | B64D 27/16 60/39.181 |
| 2010/0083851 A1 | 4/2010 | Matscheko et al. | |
| 2012/0209456 A1 * | 8/2012 | Harmon | B64C 39/024 701/3 |
| 2013/0049364 A1 * | 2/2013 | Teets | G08G 1/0129 290/45 |
| 2013/0227950 A1 * | 9/2013 | Anderson | B64D 27/24 60/718 |
| 2015/0013306 A1 * | 1/2015 | Shelley | F02K 5/00 60/224 |
| 2015/0232082 A1 * | 8/2015 | Frank | B60W 20/10 701/22 |

FOREIGN PATENT DOCUMENTS

| | | |
|---|---|---|
| DE | 31 38 376 A1 | 4/1983 |
| DE | 10156868 A1 | 5/2003 |
| DE | 202008002249 U1 | 4/2008 |
| DE | 10 2006 056 354 A1 | 6/2008 |
| DE | 10 2010 021 022 A1 | 11/2011 |
| WO | WO 2011037852 A1 | 3/2011 |
| WO | WO 2011144692 A2 | 11/2011 |

\* cited by examiner

METHOD FOR PROVIDING PREDEFINED DRIVE CHARACTERISTICS IN AN AIRCRAFT, AND ASSOCIATED DRIVE DEVICE

CROSS-REFERENCES TO RELATED APPLICATIONS

This application is the U.S. National Stage of International Application No. PCT/EP2013/060068, filed May 15, 2013, which designated the United States and has been published as International Publication No. WO 2013/186003 and which claims the priority of German Patent Application, Serial No. 10 2012 209 803.8, filed Jun. 12, 2012, pursuant to 35 U.S.C. 119(a)-(d).

BACKGROUND OF THE INVENTION.

The invention relates to a method for providing predefined nominal drive characteristics in an aircraft whose thrust generating element, i.e. its propeller, for example, is driven by an electric motor. The invention also relates to a corresponding electric drive device for rotationally driving a thrust generating element by means of an electric motor. The invention lastly relates to an aircraft, in particular a fixed wing aircraft, incorporating the drive device according to the invention.

In the case of aircraft for powered flight, the thrust element, i.e. the propeller or turbofan, for example, is nowadays generally driven by an internal combustion engine. Depending on the type and design, such an internal combustion engine has specific drive characteristics. These are characterized on the one hand by the possible torque/speed operating points which can be adopted and, on the other, by a specific response behavior. The totality of the torque/speed operating points which can be adopted by a particular prime mover defines a torque/speed map. The response behavior is the prime mover's dynamics, i.e. the change over time of the prime mover's speed and/or the change over time of the torque generated by the prime mover when the thrust lever is actuated, i.e. for a given initial position of the thrust lever and the same load, different internal combustion engines have different time characteristics of torque and speed both during acceleration and during deceleration. Many internal combustion engines react somewhat sluggishly to a power request, others tend to react immediately (different response behavior).

In today's pilot training, the trainee pilot trains on a trainer aircraft powered by a particular internal combustion engine. The trainee pilot is therefore accustomed to the drive characteristic of that internal combustion engine. However, an important aspect of pilot training is that a pilot also learns to judge how the aircraft flown by him will behave during different maneuvers. For example, if a pilot has to abort a landing and therefore go around again, it is critical for the pilot to correctly judge the response behavior of the internal combustion engine in order to avert danger. Equally a pilot must be able to judge which operating point an internal combustion engine will assume when he places the thrust lever in a particular position.

In general, an essential component of pilot training is therefore to enable the trainee pilot, by completion of that training, to fly not only his/her trainer aircraft but also an aircraft of the type he/she intends to fly in the future. However, the response behavior of this target aircraft for which the trainee pilot is to be trained cannot be simulated using the trainer aircraft, as the trainer aircraft generally has a different internal combustion engine from that of the target aircraft.

Until now it has had to be accepted that the trainer aircraft has different drive characteristics from those of the target aircraft. Consequently, further training must be undertaken on the target aircraft. In the case of large target aircraft, this means higher fuel consumption and, associated therewith, higher environmental impact. In addition, the target aircraft has to be available for training purposes, and the infrastructure required for that must be present.

SUMMARY OF THE INVENTION

An object of the present invention is to make the characteristics of different turbine, turboprop and piston engine units easier for a trainee pilot to learn and practice.

According to one aspect of the invention, the object is achieved by a method for providing predefined nominal drive characteristics in an aircraft, including driving of a thrust generating element of the aircraft by an electric motor having actual drive characteristics which at least partially include the nominal drive characteristic but are also partially different therefrom, and setting of operating points of the electric motor by a control device solely according to the nominal drive characteristics.

According to another aspect of the invention, the object is achieved by a drive device which includes a thrust generating element for producing propulsive force, an electric motor for rotationally driving the thrust generating element a control device for setting an operating point of the electric motor, and an operator device for operating point selection by a pilot, wherein the control device is designed to simulate predefined nominal drive characteristics on the basis of actual drive characteristics of the electric motor and, for this purpose, to set an operating point solely according to the nominal drive characteristics when the operator device is actuated.

According to another aspect of the invention, the object is achieved by an aircraft having a drive device as set forth above. Advantageous developments of the invention are set forth in the sub-claims.

The invention makes it possible for a plurality of target aircraft to be simulated in respect of their drive behavior using a single trainer aircraft. For this purpose, the method according to the invention makes it possible to provide, in one aircraft, predefined nominal drive characteristics of the kind also to be expected in the target aircraft for which a trainee pilot is to be trained. Said nominal drive characteristics can comprise a speed/torque map or information concerning a response behavior or both. The method according to the invention proposes that a thrust generating element of the aircraft be driven by an electric motor having actual drive characteristics which at least partially includes the nominal drive characteristics. However, the actual drive characteristics are generally not identical to the nominal drive characteristics, rather the actual drive characteristics are in some cases different from the nominal drive characteristics, because e.g. a torque/speed combination can be set with the electric motor which does not arise in the nominal drive characteristics, or because the electric motor has higher dynamics than that predefined by the nominal drive characteristics.

The method according to the invention therefore comprises a second step whereby operating points of the electric motor are set by a control device solely according to the nominal drive characteristics. In other words, during operation of the electric motor, its actual drive characteristics are limited to the extent that, from the trainee pilot's point of view, the electric motor behaves like a completely different engine having a torque/speed map and/or a response behavior as predefined by the nominal drive characteristic.

The method according to the invention advantageously enables flight training for a target aircraft to be carried out using a different trainer aircraft. Flight training on the target aircraft can therefore be replaced by appropriate training on the trainer aircraft by setting the drive characteristics of the trainer aircraft to the nominal drive characteristics. In the case of large target aircraft, this means lower fuel consumption and consequently less environmental impact. It also obviates the need to provide so many target aircraft as well as the necessary infrastructure for the training.

The drive device according to the invention enables the method according to the invention to be carried out. For this purpose the drive device has a thrust generating element for generating propulsive force, comprising in particular and un-shrouded or shrouded propeller (turbofan). An electric motor for rotationally driving the thrust generating element is additionally provided. A control device is designed to set the operating point of the electric motor. The control device can be, for example, a converter and an associated control unit, wherein a rotary current for the electric motor can be produced from a DC supply voltage by the converter, the AC frequency being set as a function of control signals from the control unit.

The drive device according to the invention lastly also comprises an operator device enabling a pilot to select an operating point. The operator device comprises in particular a thrust lever. According to the invention, the control device is now designed to simulate predefined nominal drive characteristics (i.e. those of a particular target aircraft, for example) on the basis of actual drive characteristics of the electric motor and to set an operating point solely according to the nominal drive characteristics for this purpose when the operator device is actuated.

This setting of operating points in accordance with the nominal drive characteristics can comprise two aspects, namely the question as to which operating points (torque/speed combination) can be set and the question as to the dynamics with which changeover between the current operating point and a new operating point takes place.

In this connection, according to a development of the method according to the invention, a plurality of sellable operating points, each representing a combination of a speed value and a torque value, are defined in each case by the two drive characteristics, i.e. the actual drive characteristics and the nominal drive characteristics. According to this development of the method according to the invention, the control device only sets operating points common to the two drive characteristics. In other words, by means of the predefined nominal drive characteristics, a subset of the totality of operating points assumable by the electric motor is predefined to which the operation of the electric motor is then also limited by the control device. The advantage of this development of the method is that a pilot learns to fly the aircraft with the limited number of possible operating points.

In the case of the drive device according to the invention, a torque/speed map is expediently stored in the control device for this purpose. The map can be constituted from a plurality of torque/speed value pairs for the possible assumable operating points. However, the map can also be described by parametric mathematical functions. The control device is also expediently designed to select an operating point from the torque/speed map according to a position of the operator device, i.e. a thrust lever, for example, and set it for the electric motor in a per se known manner.

According to another development of the invention, drive dynamics are defined by the two drive characteristics in each case, producing a particular change over time of a torque and/or speed of the electric motor when switching from a current operating point to a new operating point. This development of the method additionally provides that the electric motor is operated by the control device solely using such drive dynamics which are predefined by the nominal drive characteristics. This of course takes place within the electric motor's drive dynamics actually implementable by the actual drive characteristics. The advantage of this development of the invention is that the pilot learns to judge the response behavior of different target aircraft.

For the drive device according to the invention, data concerning drive dynamics are stored in the control device for this purpose, the control device then being designed to change, over time, a torque and/or a speed of the electric motor as a function of the data when the operator device is actuated. The data can be pointwise-defined characteristic curves or parametric mathematical functions, wherein as a description of the drive dynamics the data defines how the torque and/or the speed increases or decreases over time starting from a particular operating point when the position of a control element of the operator device is changed.

The predefined nominal drive characteristics preferably comprise a torque/speed map of a particular engine type, preferably of an internal combustion engine, in particular of a piston engine, turbine or turboprop unit. The drive characteristics of such internal combustion engines generally comprise fewer operating points or rather lower dynamics than the drive characteristics of an electric motor. With the drive device according to the invention, it is therefore possible to completely simulate the nominal drive characteristics of such engines.

With particular preference, a plurality of nominal drive characteristics are stored in the control device. Accordingly, the drive device is designed to switch between the nominal drive characteristics depending on an actuation of a selection device which can be a component part of the control device. This then makes it possible to simulate a plurality of different target aircraft having different drive characteristics using a single trainer aircraft The electric motor is preferably a component part of a serial-hybrid drive device. In the case of such a drive device, the electrical energy for operating the electric motor is provided by an internal combustion engine driving a generator. Optionally power can also be supplied via a battery or a fuel cell system. The voltage supplied by the generator and possibly the battery and/or fuel cell system is provided as a rectified voltage, i.e. a DC voltage, in an intermediate circuit to which a converter for operating the electric motor is connected. The advantage of a serial-hybrid drive is that the internal combustion engine can be operated with optimal efficiency for generating the electrical energy and the operating point of the electric motor can be selected completely independently thereof.

According to an alternative embodiment of the drive device, the electric motor is part of a parallel-hybrid drive device. Here an internal combustion engine is coupled mechanically, e.g. via a shaft, to a thrust generating element, i.e. a propeller, for example. The electric motor is then disposed on the drive shaft of the internal combustion engine or coupled thereto via a belt and can thereby generate an additional torque for driving the thrust generating element. The advantage of this embodiment is that the electric motor can be incorporated into an existing drive system of a trainer aircraft with minimal development cost/complexity.

As already mentioned, the invention also includes an aircraft incorporating an embodiment of the drive device according to the invention.

BRIEF DESCRIPTION OF THE DRAWING

The invention will now be explained again in greater detail with reference to a concrete example whereby.

DETAILED DESCRIPTION OF PREFERRED EMBODIMENTS

In the example explained below, the described components of the drive device in each case constitute individual features of the invention that are to be considered independently of one another and which also develop the invention independently of one another in each case and are therefore also to be regarded as part of the invention individually or in a combination other than that shown. In addition, the embodiment described can also be supplemented by other already described features.

Figure 1:
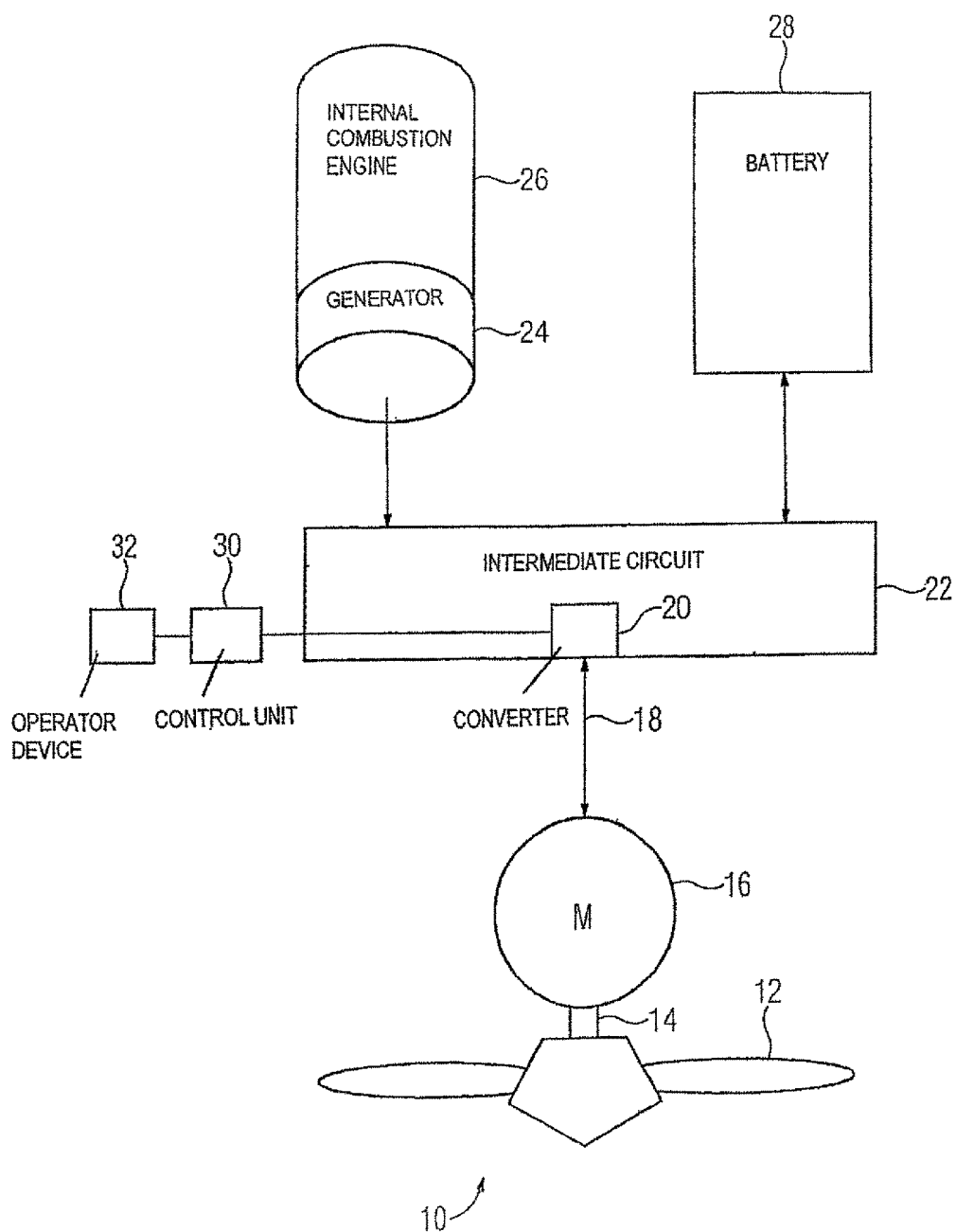
FIG. 1 schematically illustrates a preferred embodiment of the drive device according to the invention and FIG. 2 shows a diagram with schematized drive characteristic curves.
Figure 2:
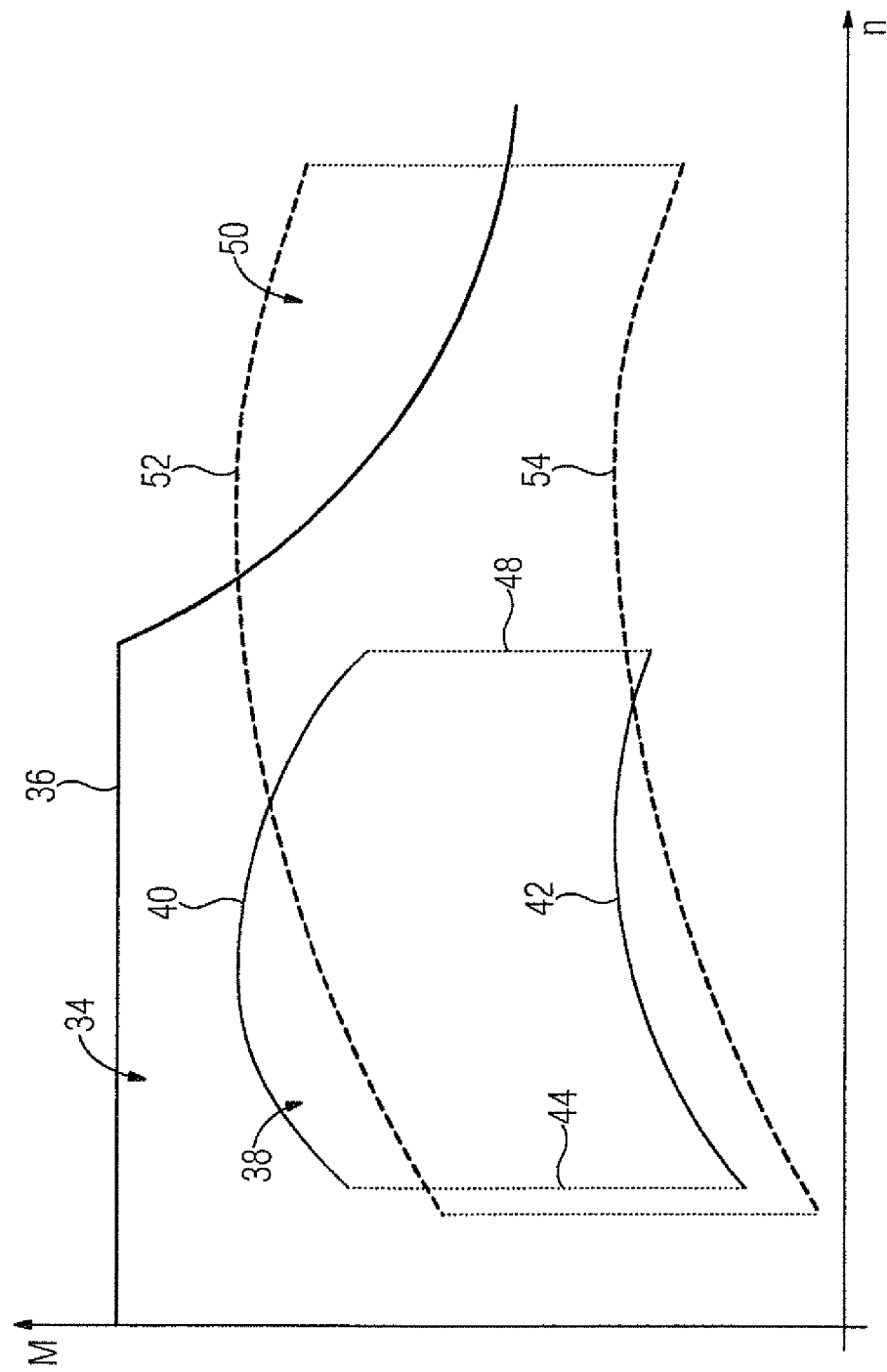

FIG. 1 shows a drive device 10 of an aircraft, e.g. a light aircraft. A propeller 12 for generating thrust for flying the aircraft is rotated by an electric motor 16 via a shaft 14. The electric motor 16 can be e.g. a synchronous machine, in particular a permanent magnet excited synchronous machine. The electric motor 16 is driven via a cable 18 using a polyphase rotary current in a per se known manner. The cable 18 is connected to a controllable converter 20 of an intermediate circuit 22. A rectified voltage present between electrical conductors of the intermediate circuit 22 is converted by the converter 20 into the polyphase AC voltage in a likewise per se known manner. The rectified voltage is produced by generator 24 which injects it into the intermediate circuit 22 via a rectifier. The generator 24 is driven by an internal combustion engine 26. Additionally connected to the intermediate circuit 22 is a battery 28 which can be charged with electrical energy from the generator 24 via the intermediate circuit 22. The battery 28 is designed to supply the electric motor 16 with additional electrical energy during takeoff of the aircraft. Altogether the drive device 10 constitutes a serial-hybrid drive system. Instead of or in addition to the battery 28, a fuel cell system can be provided as an additional energy source.

instead of the electric motor 16 being directly coupled to the propeller 12 via the shaft 14 as shown in FIG. 2, the electric motor 16 can also be coupled to the propeller 12 via a gearbox, This is generally possible for all embodiments of the drive device according to the invention. The advantage of a gearbox is that a particular thrust which the propeller 12 is designed to produce can be provided using an electric motor 16 using a combination of speed and torque that is different from the torque/speed combination of the propeller 12. This can provide advantages in terms of wear and efficiency of the electric motor. The internal combustion engine 26 can also be mechanically coupled to the generator 24 via a gearbox. This is also possible for all embodiments of the drive device according to the invention.

The drive characteristics of the electric motor 16 have a larger set of operating points (torque/speed combinations) than a comparable internal combustion engine of the type used in a conventional aircraft for rotationally driving the shaft 14 and therefore the propeller 12. The electric motor also responds more quickly, i.e. its dynamics are greater than those of a comparable typical internal combustion engine for an aircraft of the type described here.

In the case of the drive device 10, the controlling of the converter 20 is configured via an electronic control unit 30 of the electric motor 16 by appropriate programming such that either only the response behavior or only the torque/speed map, or even both together, of different types of internal combustion engine is simulated by the drive device 10. In this example, corresponding data relating to these different nominal drive characteristics is stored in the control unit 30. The pilot of the aircraft can select the desired nominal drive characteristics to be simulated by the control unit 30 via an operator device 32, e.g. via a selection menu on a screen in the cockpit or via a selector switch. According to the selection, values for control parameters of the control system of the electric motor 16 are set in the control unit 30. The electrical drive device 10 then reacts to a thrust lever movement and thrust lever position of a pilot-operated thrust lever in the cockpit in exactly the same way as the internal combustion engine to be simulated and/or the entire target aircraft having the nominal drive characteristics would react. The gives the pilot the feel of the target aircraft even before flying it for the first time.

To illustrate the control method, FIG. 2 shows a comparison of a torque/speed map 34 of the electrical machine 16. The characteristic map 34 specifies what torque M the electric motor 16 can develop at what speed n. The map 34 of the electric motor 16 indicates that any operating point (M/n combination) can be set between the value M=0 and a speed-dependent maximum value defined by the limit line 36. By way of comparison, FIG. 2 also shows an internal combustion engine map 38 which is limited in the upward direction by a full-load line 40. The full-load line results from the internal combustion engine's throttle being fully open. At low torques, the map 38 is constituted by a lower curve 42 which cannot be undershot, as otherwise the throttle would have to be closed to such an extent that the internal combustion engine stops. Further limits are formed by a minimum speed 44 and a maximum speed 48. The internal combustion engine's nominal drive characteristics defined by the map 38 are completely encompassed by the map 34, i.e. contained therein. The behavior of an internal combustion engine having the map 38 can therefore be completely simulated by means of the drive device 10. For this purpose, solely the operating points (M/n combinations) that are predefined by the map 38 are set by the control unit 30 during operation of the electric motor 16.

For implementation of the invention, it is not necessary for a map predefined by the nominal drive characteristics to be completely encompassed by the map 34 of the electric motor. For training in particular flight maneuvers, it may be sufficient if solely the operating points necessary for the training can be reproduced by means of the drive device 10. Concerning this, FIG. 2 shows another map 50 which, in a similar manner to the map 38, is defined by operating points which lie between an upper curve 52 and a lower curve 54. As FIG. 2 shows, the drive device 10 enables all the operating points of the internal combustion engine described by the map 50 that are common to the maps 50 and 34 to be reproduced by the drive device 10.

In a comparable manner, as illustrated by FIG. 2 using the operating points, the dynamics of an internal combustion engine can also be reproduced by means of the drive device 10.

The benefit for pilot training in a trainer aircraft equipped with an electric propeller drive and an appropriately programmed drive control system is that the characteristics of different turbine, turboprop and piston engine units can be learnt and practiced.

The invention claimed is:

1. A method for providing in an aircraft a predefined nominal drive characteristic which comprises a speed/torque map or information concerning a response behavior of the aircraft or both, said method comprising:
   storing in a plurality of nominal drive characteristics of a trainer aircraft in a control device;
   driving a thrust generating element of a target aircraft by an electric motor having an actual drive characteristic which at least partially includes one of the stored nominal drive characteristics of the trainer aircraft but is not identical to stored nominal drive characteristics;
   setting with the control device of the target aircraft operating points of the electric motor solely according to the nominal drive characteristic through actuation of an operator device of the target aircraft; and
   switching with the control device of the target aircraft between nominal drive characteristics selected from the plurality of nominal drive characteristics in dependence on an actuation of a selector device of the control device of the target aircraft.

2. The method of claim 1, wherein a plurality of settable operating points, each defined by a combination of a speed value and a torque value, are respectively determined by the actual and nominal drive characteristics, wherein only operating points having the actual and nominal drive characteristics in common are set by the control device.

3. The method of claim 1, further comprising defining by the actual and nominal drive characteristics a drive dynamics which describes a change over time of a torque or of a speed of the electric motor when changing from a current operating point to a new operating point, and operating the electric motor by the control device solely using the drive dynamics predefined by the nominal drive characteristic.

4. A drive device for an aircraft, comprising:
   a thrust generating element configured to produce a thrust;
   an electric motor configured to rotationally drive the thrust generating element;
   an operator device for allowing a pilot to select an operating point, and
   a control device configured to store a plurality of nominal drive characteristics of a trainer aircraft , to set the selected operating point of the electric motor of a target aircraft and to simulate a predefined nominal drive characteristic of the electric motor based on an actual drive characteristic of the electric motor which at least partially includes one of the stored nominal drive characteristics but is not identical to stored nominal drive characteristics, and to set in response to actuation of the operator device of the target aircraft the operating point of the electric motor solely according to the simulated nominal drive characteristic, the control device further configured to switch with the control device of the target aircraft between nominal drive characteristics selected from the plurality of nominal drive characteristics in dependence on an actuation of a selector device of the control device of the target aircraft.

5. The drive device of claim 4, wherein the nominal drive characteristic comprises a torque/speed map which is stored in the control device, said control device being configured to select and set an operating point from the torque/speed map depending on a position of the operator device.

6. The drive device of claim 4, wherein the nominal drive characteristic includes drive dynamics data which are stored in the control device, said control device being configured to change a torque or a speed of the electric motor over time as a function of the data when the operator device is actuated.

7. The drive device of claim 4, wherein the nominal drive characteristic comprises a torque/speed map of a predefined engine.

8. The drive device of claim 7, wherein the predefined engine type is an internal combustion engine.

9. The drive device of claim 4, wherein the thrust generating element comprises a propeller, a turbofan or a turboprop.

10. The drive device of claim 4, wherein the operator device is a thrust lever.

11. The drive device of claim 4, wherein the electric motor is part of a serial hybrid-drive device.

12. The drive device of claim 4, wherein the electric motor is part of a parallel-hybrid drive device.

13. A target aircraft, comprising a drive device which includes
   a thrust generating element configured to produce a thrust;
   an electric motor configured to rotationally drive the thrust generating element;
   an operator device for allowing a pilot to select an operating point, and
   a control device configured to store a plurality of nominal drive characteristics of a trainer aircraft, to set the selected operating point of the electric motor and to simulate a predefined nominal drive characteristic of the electric motor based on an actual drive characteristic of the electric motor which at least partially-includes one of the stored nominal drive characteristics but is not identical to stored nominal drive characteristics, and to set in response to actuation of the operator device the operating point of the electric motor solely according to the simulated nominal drive characteristic, the control device further configured to switch with the control device of the target aircraft between nominal drive characteristics selected from the plurality of nominal drive characteristics in dependence on an actuation of a selector device of the control device of the target aircraft.

14. The aircraft of claim 13, wherein the nominal drive characteristic comprises a torque/speed map which is stored in the control device, said control device being configured to select and set an operating point from the torque/speed map depending on a position of the operator device.

15. The aircraft of claim 13, wherein the nominal drive characteristic includes drive dynamics data which are stored in the control device, said control device being configured to change a torque or a speed of the electric motor over time as a function of the data when the operator device is actuated.

16. The aircraft of claim 13, wherein the nominal drive characteristic comprises a torque/speed map of a predefined engine.

17. The aircraft of claim 16, wherein the predefined engine type is an internal combustion engine.

18. The aircraft of claim 13, wherein the thrust generating element comprises a propeller, a turbofan or a turboprop.

19. The aircraft of claim 13, wherein the operator device is a thrust lever.

20. The aircraft of claim 13, wherein the electric motor is part of a serial-hybrid drive device.

21. The aircraft of claim 13, wherein the electric motor is part of a parallel-hybrid drive device.

\* \* \* \* \*